No. 779,067. PATENTED JAN. 3, 1905.
B. B. BRIGGS.
FIRE ESCAPE.
APPLICATION FILED JAN. 22, 1904.

Witnesses:
Silas W. Gauldin.
James Gault.

Inventor:
Burdett B. Briggs.

No. 779,067.

Patented January 3, 1905.

UNITED STATES PATENT OFFICE.

BURDETT B. BRIGGS, OF CRESTON, IOWA.

FIRE-ESCAPE.

SPECIFICATION forming part of Letters Patent No. 779,067, dated January 3, 1905.

Application filed January 22, 1904. Serial No. 190,172.

*To all whom it may concern:*

Be it known that I, BURDETT B. BRIGGS, a citizen of the United States, residing at Creston, in the county of Union and State of Iowa, have invented certain new and useful Improvements in Fire-Escapes; and my preferred manner of carrying out the invention is set forth in the following full, clear, and exact description, terminating with claims particularly specifying the invention.

My invention relates to improvements in fire-escapes, more especially to that kind in which automatic retarding mechanism operates in conjunction with a chute, and to improvements made by myself in an application filed March 16, 1903, Serial No. 148,073; and the objects of the same are, first, to provide an improved means for regulating the descent of a person down the chute, in which inclined wings are so arranged that a large or small person may descend through the chute at about the same velocity; second, to provide an arrangement of wings or body-clutches that prevent the body from dropping, so as to reduce liability of the body being bruised and otherwise hurt; third, to provide such an improvement of the retarding mechanism as to prevent the chute being clogged up with persons of different sizes and whether sensible or insensible.

To this end the invention consists in the details of construction hereinafter more fully described and claimed and as shown in the accompanying drawings, which form part of this specification, wherein—

Figure 1:
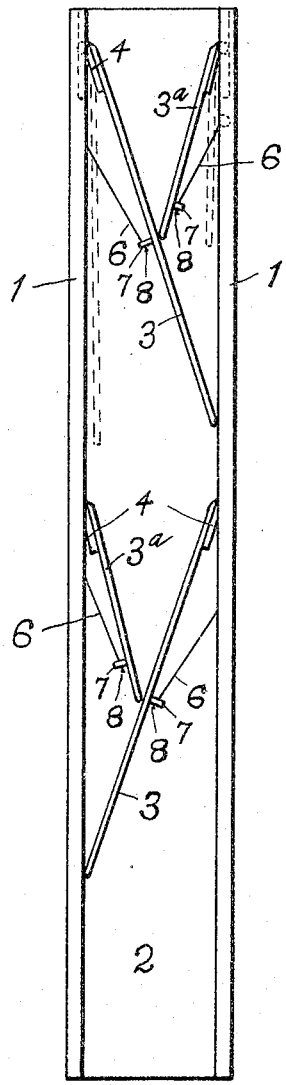
Figure 2:
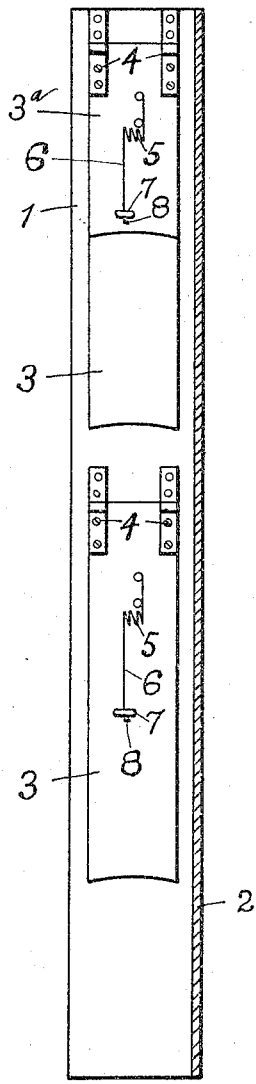

Figure 1 is a front elevation of my improved fire-escape. Fig. 2 is a side elevation of same, the side of the chute being cut away to show the wings and springs.

Referring to the drawings, similar characters of reference refer to similar parts throughout both views.

1 1 designate the two sides of the chute, and 2 the back of the chute. This chute may be of any suitable construction. Therefore no further detail of the same is given herein. Several wings or body-regulators 3 are located on opposite sides of the chute and are hinged at one end to said sides, as at 4, as seen in Figs. 1, 2, the wings on one side being located alternately with those of the opposite side, and the free or movable end of each of the wings 3 extends across to the opposite side of the chute, so as to close or shut the passage-way of the chute, as best seen in Fig. 1. Another set of wings (designated as $3^a$ and of less length than the wings 3) are located opposite the wings 3, as shown in Fig. 1. As will be seen, the wings $3^a$ are also located on opposite sides of the chute, the short wings of one side being located alternately with the short wings of the opposite side. The wings $3^a$ are so arranged as to have their free ends meet with the wings 3 at a point remotely above the lower or free end of the wing 3, as shown in Fig. 1. Each wing 3 and $3^a$ is provided with a spring 5, which is attached to the side of the chute and provided with a longitudinal arm 6, extending therefrom to the wing or to a suitable loop 7, secured to the outside of the wing, as shown in Figs. 1, 2. The end of the arm 6 is provided with a suitable projection or stop 8 to prevent the wings $3^a$ from swinging across the chute to the opposite side when the wings 3 are swung outward parallel with the sides of the chute. The coil portions 5 of the spring is embedded into the side of the chute, so as to let the wings swing back to the side of the chute. Not only are the sides recessed for the springs, but for the hinges also, as shown in dotted lines, Fig. 1.

It will be seen that when the wings are pressed outward and open the passage-way the springs increase in tension and efficiency and that the wings will have more retarding effect on a large body than a small body, whereby a small child can descend through the chute with equal safety or velocity as a larger person. Others have proposed fire-escapes having platforms with spring-cushions, and the platforms only extending to the center of the chute and arranged alternately and leaving an open space for the body to fall or pass through without being clutched and the wings not meeting or adapted to be swung downward and out to side of fulcrum, and consequently affording a device to be choked up with bodies and imperil life.

In Fig. 2 I have shown the free end of the wings concaved or hollowed out, which adapts the wings to have more bearing on the body of a person at this point and also renders them less liable to chafe the face of a person passing between the wings; but the wings may be any suitable shape for the purpose set forth.

Heretofore it has been proposed to construct fire-escapes with zigzag partitions which only extended to the center of the chute, and the partitions or wings not being adapted to be swung down and outward therefrom it was necessary to make the chute of a very large size. Again, by such an arrangement the body would fall or drop from one wing to another, and the wings not coming close together so as to clutch the body a large body would descend much faster than a light body, consequently rendering the device impracticable for use as a fire-escape. It will also be observed that my wings are adapted to be swung down and outward to the sides of the chute (shown in dotted lines in Fig. 1) and that it would not become choked up with bodies, as would be the case were the wings not free to be pressed downward or outward and open the passage-way.

My construction of coöperating the short wings with the long wings prevents the body falling from one set of wings to another, and the wings being adapted to be swung outward parallel with the side of chute a very small space is required between the two sides of the chute.

Having described my invention, what I claim as new, and desire to secure by Letters Patent, is—

1. In a fire-escape chute, retarding-wings hinged on opposite sides of said chute and the wings of one side located alternate the wings of the opposite side, the movable end of said wings extending across the chute to the opposite side from hinge side, and the movable end of said wings adapted to be swung back toward hinge side, and means to return the wings to their normal position, for the purpose set forth.

2. The combination in a fire-escape chute, spring-pressed retarding-wings hinged on opposite sides of said chute and the wings of one side located alternate the wings of the opposite side, and the movable end of said wings extended across the chute to the opposite side from hinge side, comparatively short wings located oppositely and on the opposite side from the long wings, and the movable end of the short wings extended across to the long wings, and both sets of wings adapted to be swung out toward their hinge sides respectively, all substantially as set forth.

3. The combination with a fire-escape chute, of a spring-pressed retarding-wing secured at one end to one side of said chute, the movable end of said wing extending across to the opposite side of the chute, and adapted to be pressed down and outward therefrom, substantially as set forth.

4. The combination in a fire-escape chute, of a spring-controlled retarding-wing hinged at one end to the side of said chute, and the movable end of said wing extended across the passage-way of said chute to the opposite side from hinge, and adapted to be swung down and back toward the hinge side, substantially as specified.

5. The combination with a fire-escape chute of a spring-controlled retarding-wing secured at one end to the side of said chute, the movable end of said wing extending across the passage-way to the opposite side of said chute, another spring-controlled wing located oppositely the first wing, and the free end thereof extending toward the first wing, and each wing adapted to be swung outward from the other, substantially as set forth.

6. The combination with a fire-escape chute, of a spring-controlled retarding-wing movably fastened at one end to the side of said chute, the movable end of said wing extending downward and across the passage-way of said chute, a spring-controlled comparatively short wing movably fastened on the opposite side from the fulcrum of the long wing, and the movable end of said short wing extending down and across to the long wing, and each wing adapted to be swung outward from the other, substantially as set forth.

7. In a fire-escape chute, spring-controlled retarding-wings hinged on opposite sides of the chute, the wings of one side alternating with the wings of the opposite side, and the movable end of said wings extending downward and across to the opposite side of the chute from the hinge side, said wings adapted to be swung back toward the hinge side, for the purpose set forth.

8. In a fire-escape chute, a spring-controlled wing fastened at one end to the side of said chute and the free end of the wing extending downward and across the chute, another spring-controlled wing fastened at one end to the side of the chute opposite the first wing, and the free end of the second wing meeting the first-mentioned wing at a point above the free end thereof, said wings adapted to be swung outward one from the other, as set forth.

9. In a fire-escape chute, a spring-pressed wing hinged at one end to the side of said chute, and the free end of the wing extending downward and across toward the opposite side from the hinge side, a spring-pressed wing hinged at one end to the side of the chute opposite the first-mentioned wing, and the free end of the second wing meeting the first wing above the free end thereof, said wings adapted to be swung back toward their hinge sides respectively.

10. In a fire-escape chute, retarding-wings secured on said chute, and the lower ends of said wings concaved.

In testimony whereof I have hereunto subscribed my name to this specification, at Creston, in the county of Union and State of Iowa, this 19th day of January, 1904, in the presence of two subscribing witnesses.

BURDETT B. BRIGGS.

Witnesses:
SIDNEY RICHARDSON,
WILLIAM A. PALMER.